July 9, 1968  F. L. MESSIER  3,391,500
FLUID OPERATED STEADY REST WITH AUTOMATIC FEED
Filed April 1, 1965
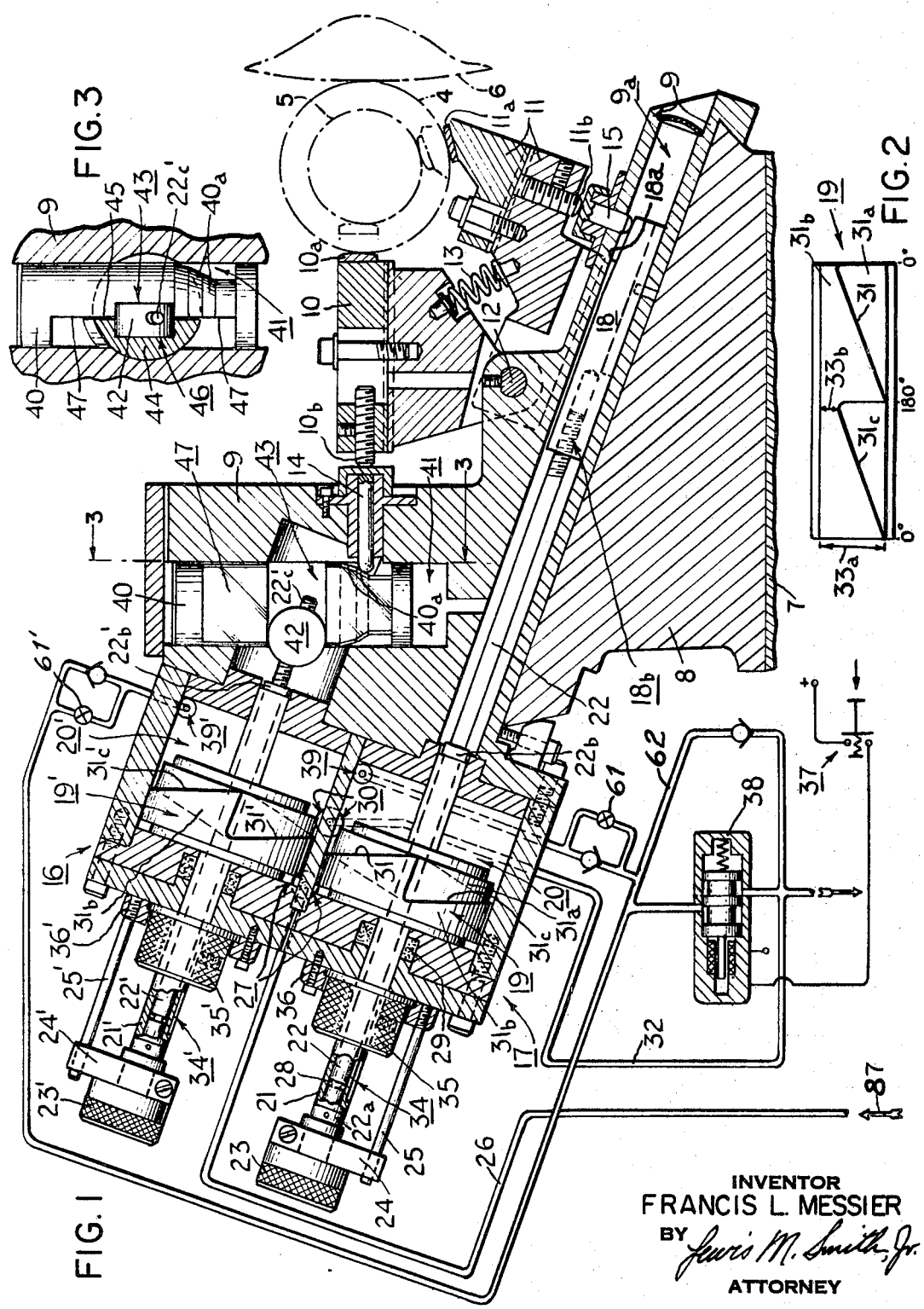
INVENTOR
FRANCIS L. MESSIER
BY
*Lewis M. Smith, Jr.*
ATTORNEY

United States Patent Office 3,391,500
Patented July 9, 1968

3,391,500
FLUID OPERATED STEADY REST WITH AUTOMATIC FEED
Francis L. Messier, Worcester, Mass., assignor to Norton Company, Worcester, Mass., a corporation of Massachusetts
Filed Apr. 1, 1965, Ser. No. 444,641
11 Claims. (Cl. 51—238)

ABSTRACT OF THE DISCLOSURE

A steady rest assembly with separate workpiece engaging shoes both coupled by separate adjustable connecting linkages to separate actuating pistons individually and independently adjustable by separate control knobs operative to vary the point of transition of the respective actuating pistons from one shoe actuating mode to another, and separate shoe position control knobs individually and independently operative to adjust the respective connecting linkages to vary the positions of the respective shoes relative to the respective pistons.

---

The present invention relates to improvements in the automatic positioning of members such as grinding machine steady rests and the like, and, in one particular aspect, to novel and improved actuators of the piston-cylinder type wherein uniquely-shaped fluid-valving surfaces on the piston are readily adjusted through simple angular settings to control feed rates during different portions of strokes which position such items as work supports during automatic grinding operations.

In the precision machining of workpieces while they are subject to deformations either because of their own mass distributions or because of externally-applied loadings, it has been a known practice to provide auxiliary compensatory support or steadying at localized positions. Grinding machines operating upon certain portions of elongated heavy workpieces such as crankshafts, for example, have been equipped with so-called "steady rests" which engage the machined article at points opposite and below its line of contact with the grinding wheel, for the aforesaid steadying and support purposes, and it has been known to articulate these steady rests hydraulically to achieve independent automatic control of their respective functions during the machining operations. In such applications of hydraulic actuators, it is desirable to regulate their feeds for the different operating conditions involved, without depending upon complicated and costly control systems. According to the present teachings, precise wide-range control of this nature is realized through simple angular adjustments of specially-shaped piston elements relative to cooperating valving ports in associated cylinders, such that the need for separate accessory sensors and regulators is advantageously obviated.

It is one of the objects of the present invention, therefore, to provide novel and improved fluid-pressurized actuators, for the mechanical feed of grinding machine stead rests and the like, wherein operations are precisely regulated by self-contained readily-adjustable valving provisions.

Another object is to provide unique hydraulic actuators, for the improved articulation of such members as grinding machine steady rests, in which specially-contoured surfaces of angularly-adjustable pistons automatically and directly control valving actions required for accurate operation of the actuators.

A further object is to provide new and advantageous hydraulic actuators for steady rests and the like in which automatic precise feed regulation is achieved via angular adjustments of pistons having helical valving surfaces cooperating with valving ports in surrounding cylinder surfaces.

Still further, it is an object to provide new and improved grinding machine steady rest apparatus of economical construction having mechanical and hydraulic niceties which promote simple and precise adjustments and automatic feeds of steady rests.

By way of a summary account of practice of this invention in one of its aspects, the work-supporting table of a grinding machine mounts a steady rest assembly involving a pair of hydraulic piston-cylinder units each disposed to articulate a different one of two adjustable steady rest shoes which are located for movements into supporting engagement with predetermined portions of a rotatable workpiece carried by the usual headstock and footstock of the machine. Each of the piston-cylinder units includes a hollow piston shaft in surrounding relation to a portion of a coaxial rod connected to a cam which may be adjusted lengthwise to set the position of one of the movable steady rests, and, further, the piston member fixed with the piston shaft has opposed working faces interconnected by a cylinder surface modified to include a partly-relieved exterior valving surface which has a helical pattern of less than one turn. A pressure-controlling hydraulic fluid port in a predetermined part of the adjoining inner cylinder wall is automatically closed by the unrelieved valving surface of the cooperating piston only when the piston has travelled a predetermined variable distance, depending upon the angular setting of the combination piston-valve in relation to the fluid port. Desired angular settings, and, hence, lengths of piston stroke prior to port closure, are established by angular keying of the piston shaft with a manually-adjustable control knob, and powered actuations of the steady rests by the hollow piston shafts are developed through mechanical abutments or stops which insure that the piston thrusts will be communicated to these articulated supports.

Although the aspects and features of this invention which are believed to be novel are expressed in the appended claims, additional details as to preferred practices and embodiments, and as to the further advantages, objects and features thereof, may be most readily comprehended through reference to the following description taken in connection with the accompanying drawings, wherein:

FIGURE 1 presents a side view, mainly in vertical cross-section, of an improved dual-control hydraulic steady rest arrangement for a grinding machine;

FIGURE 2 is a development of the external surfaces of a piston-valve unit such as those illustrated for the hydraulic actuators appearing in FIGURE 1; and FIGURE 3 is a detail of one of the steady rest camming assemblies, viewed at the site of and in the direction of section lines 3—3 in FIGURE 1.

The apparatus depicted in FIGURE 1 comprises a steady rest portion of a grinding machine which serves to exert auxiliary supporting forces upon certain surfaces of workpieces which are being shaped by a relatively-rotated grinding wheel. Linework identified by reference numerals 4 and 5 characterize the transverse cross-sectional outlines of different-size elongated workpieces, which are carried by the usual headstock and footstock elements (not visible) of the machine, and the outline 6 of a fragment of an associated abrasive grinding wheel characterizes its customary relationship to the larger workpiece during the material-removal process. A conventional wheel slide feeding mechanism (not illustrated) advances the grinding wheel to grind a workpiece. The machine frame 7 carries a work table 8 and steady rest base 9 on which a pair of steady rests, 10 and 11, are mounted by way of a common pivot 12 which accommodates certain limited angular movements to vary the positions of the work-engaging shoes 10a and 11a by means of the knobs 23 and 23' or pistons 19 and 19', as described below. Compressed spring 13 urges the two steady rests in opposite angular directions about the pivot axis, thereby tending to separate both shoes from the workpiece and biasing the adjustable force-transmitting members 10b and 11b into engagement with the actuating members 14 and 15, respectively, which are slidable in the steady rest base 9. Various adjustment and locking provisions are shown for the two steady rests, permitting them to be preset for optimum orientations of the shoes in relation to the adjacent portions of workpieces of various substantially different diameters with each steady rest shoe initially positioned and secured in closely adjacent relation to the workpiece. In a generally conventional manner the upper steady rest shoe 10a is disposed for encounter with the workpiece at a point diametrically opposite the locus of contact between the grinding wheel and workpiece, and the lower steady rest shoe 11a is disposed to engage the workpiece at a position below its longitudinal axis and somewhat nearer the grinding wheel contact position. These shoes serve important supporting and steadying functions, and are intended to be moved into and out of operative relations with the work and to be continuously and forcefully urged against it in a follow-up manner as material-removal proceeds.

Powered actuations of the articulated steady rests are induced hydraulically by a pair of similar piston-cylinder units 16 and 17 mounted on the base 9, in front of the steady rests, workpiece, and grinding wheel. The lower unit 17 is associated with a tapered longitudinally-slidable cam member 18 located and keyed within an opening 9a in the steady rest base; inclined camming surface 18a moves the actuating member 15 as a rider and thereby produces desired motions of the work-steadying shoe 11a. Piston member 19 of unit 17 is acted upon by hydraulic fluid pressures within the cylinder 20 and responds to differential pressures by developing related axial movements and thrusts of a hollow piston shaft 21. Ends of the latter shaft are in abutting engagement with enlarged shoulders 22a and 22b of a coaxial inner adjusting rod 22, such that movements and forces of the hollow piston shaft are at all times communicated to that rod and, therethrough, to the slidable cam member 18 with which its inner end is threadedly engaged at 18b. Knob 23, at the outer end of and pinned to actuating rod 22, enables manual turning of that rod with consequent axial adjustment of the slidable camming member 18 with which it is threaded at 18b for that purpose. Locking collar 24, which is slidable on a shaft 25 fixed with base 9, may be tightened to prevent unintended turning of the adjusting knob 23 once a desired initial setting of the camming member (and, hence, shoe 11a) has been realized.

Pressures of hydraulic fluid forced into conduit 26 in direction of arrow 87 are communicated to cylinder 20 via the cylinder port 27 at one end, and tend to force the piston 19 to the right in the illustration. Simultaneously, the hollow piston shaft is moved by the piston and concomitantly carries the coaxial actuating rod 22 and the camming member 18 with it, thus forcing the steady rest shoe 11a against the workpiece in the desired manner. O-ring seal 28 maintains fluid-tight sealing, as does also the packing 29. It should be understood that O-ring seal 28 is representative of one type of fluid-tight seal suitable for use at all of the annular joints in the apparatus disclosed which require a fluid-tight seal, although a showing of such seals has been omitted at all of the other annular fluid-tight joints illustrated in FIGURE 1 in order to simplify the showing in FIGURE 1.

Since the hydraulic fluid initially may escape through conduit 32 connected to cylinder 20 through port 30, piston travel continues until the fluid-exhaust port 30 is closed by its leading edge 31, whereupon the piston is prevented from moving further because of the hydraulic fluid entrapment in the right side of cylinder 20. It is important that the length of stroke involved in the aforesaid feeding action be readily controllable, rather than fixed, so that the initial relatively rapid movement of the piston 19 may be coordinated with a predetermined relatively fast portion of the feeding cycle automatically followed by the conventional wheel slide feeding mechanism of the grinding machine. For the latter purpose, the valving leading edge 31 of the piston is of helical contour about the piston axis, and extends about half-way (180°) about that axis, giving a wide range of effective piston thicknesses and valving actions.

Conveniently, the piston is generally cylindrical, and the valving leading edge is formed adjoining a relieved portion 31a which is merely of lesser diameter than the main exterior of the piston, 31b, which fits closely within the cylinder walls. Two such helically-contoured edges are provided, the other (31c, FIGURE 2) providing a symmetry which promotes desired balancing of fluid-pressure forces experienced by the piston. As is shown in the piston surface development of FIGURE 2, the helical edges are of about the same length and slope, and the effective piston thicknesses 33a–33b vary by amounts depending upon the differences in the stroke lengths which are necessary to provide an adequate range of adjustment.

Angular adjustments of the piston, via its hollow piston shaft 21, enable the desired valving actions and consequent initial relatively fast infeed stroke lengths to be regulated accurately and easily. In the latter connection, the outwardly-extending end of the piston shaft 21 is slidably keyed, angularly, by way of a longitudinally-extending keyway 34, with a rotatable setting knob 35 which is axially restrained and may be angularly locked by an adjustable clamping member 36 fixed with the base 9. Turning of this knob effects angular adjustments of the piston 19 alone, without affecting the angular adjustment of the coaxial rod 22.

At a predetermined time during the grinding operation, the normally-open electrical limit switch 37 is closed responsive to a predetermined feeding movement of the grinding wheel. For example, the limit switch 37 may be positioned so that it is engaged and closed by the wheel slide (not illustrated) supporting the grinding wheel or by some other element movable in response to feeding movement of the wheel slide. When the limit switch 37 is closed a solenoid valve 38 is energized through that switch to open the further exhaust port 39 and thereby relieve cylinder fluid pressures opposing further piston travel. Thereupon, the piston 19 forces the steady rest shoe 11a further in direction toward the workpiece at a controlled "follow-up" rate determined by needle valve 61 properly coordinated with the relatively slow fine feeding portion of the feeding cycle automatically followed by the wheel slide feeding mechanism of the grinding machine.

After the wheel feeding cycle has been terminated in the known manner by a fixed stop on the grinding machine or by a signal from an in-process gage engaging the workpiece, the piston 19 may be returned to its starting position illustrated in FIGURE 1 by actuation of a suitable reversing means such as a conventional reversing valve (not illustrated) operable to connect conduit 26 to exhaust and to connect conduit 62 to the source of pressurized hydraulic fluid.

The second piston-cylinder unit 16 is of like construction and operates similarly, though being independently adjustable for the separate control of steady rest shoe 10a. Constructional details are thus identified by the same reference characters applied to the functionally-comparable elements of unit 17, with distinguishing single-prime accents being added. Fluid inlet port 27 is conveniently formed in common for the two cylinders 20 and 20', as is also the valving exhaust port 30, although it should be evident that these may instead comprise separate ports, particularly where the cylinders are not located side-byside. The actuating rod 22', disposed coaxially within hollow piston shaft 21', is intended to couple to sliding member 14 (and, hence, to steady rest 10) both the adjustments of knob 23' and the movements and forces derived from piston 19' through piston shaft 22'. For these purposes, the slidable actuator member 14 is, like member 15, cammed into movements, but, in this instance, by a unique camming member 40 which is slidable within a substantially vertically base passageway 41 disposed out of axial alignment with the inclined actuating rod 22'. As is apparent from the illustrations in FIGURES 1 and 3, the tapered camming surfaces 40a near the lower end of the piston-like member 40 will thrust rider 14 and steady rest 10 further to the right as that member is forced further in the downward direction. In turn, the extents to which camming member 40 is driven downwardly depend upon the orientations of a shallow cylindrical disk 42 along the axis of the actuating rod 22' to which it is fixed by way of a screw-threaded connection at the end 22c' of rod 22'. Disk 42 is mated with member 40 in a close-fitting relationship in a transverse slot 43, and movements of the disk along the inclined axis thus necessarily involve desired concomitant vertical movements of the camming member. Preferably, a substantially semicylindrical stationary guide 44 (visible only in FIGURE 3), affixed to the base 9, also cooperates with the aforesaid parts, and has its flat side 45 slotted, at 46, to guide sliding movements of disk 42 in directions along the axis of actuating rod 22'; the flat 45 also engages a recessed flat side surface 47 of camming member 40. This arrangement prevents undesired turning of either the disk 42 or the camming member 40. Initial setting adjustments are made by turning knob 23', whereby threaded end 22c' of rod 22' turns relative to the mated disk 42, causing the disk to move along the adjusting rod axis and to set cam 40, rider 14, force-transmitting member 10b, steady rest 10, and work-support shoe 10a. Thereafter, the fluid-powered movements of piston 19' are translated into similar axial movements of the disk, and consequent powered actuations of shoe 10a; in this connection, the angular adjustments of knob 35' serve to regulate the valving actions of piston 19' and thereby control the length of initial piston stroke in a manner already described herein with reference to piston-cylinder unit 17.

Although the preferred piston-valve elements are each illustrated with only one substantially helical leading edge performing the valving, with a substantially uniform lead or pitch, and with a symmetrical or hydraulically-balanced arrangement of two such portions, such an edge, or edges may have stepped or other varying slopes, rather than constant slope, and may extend a full turn rather than only half, in other designs. Accordingly, as to this and other features, it should be understood that the specific embodiments and practices described and portrayed have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. In a grinding machine having means for supporting a workpiece in position to be operated upon by a grinding wheel and having a plurality of steady rest means mounted on a relatively fixed base for movement into and out of steadying engagement with the workpiece, fluid motor means for moving each said steady rest means comprising a cylinder fixedly secured to the base having spaced fluid inlet and exhaust ports in the side wall thereof, a substantially cylindrical piston slidable within each said cylinder responsive to differences in fluid pressures on the opposed working faces thereof, at least a portion of the leading edge of at least one side of each said piston being of substantially helical distribution about the central axis of each piston and cylinder and being disposed to block each said exhaust port at a predetermined position along each said axis which depends upon the angular orientation of each said piston about said axis, a piston shaft fixedly secured to and movable with each said piston and extending outside of each said cylinder, first adjusting means selectively operative for adjustably setting the angular position of each said piston shaft and piston about each said axis, adjustable connecting means for moving each said steady rest means responsive to relative axial movements between each said cylinder and piston, whereby movements of each said steady rest means are determined by the angular setting of said piston about said axis, and second adjusting means selectively operative for adjustably setting the relative positions of each said piston and each said steady rest means maintained by each said connecting means, each said first adjusting means and each said second adjusting means being mutually independently operative.

2. Machine tool apparatus having means for supporting a workpiece in position to be operated upon by a tool and having steady rest means mounted on a base for movement into and out of steady engagement with the workpiece, fluid-powered means on said base for moving said steady rest means including a cylinder having axially-spaced fluid ports in the side wall thereof, a substantially cylindrically-surfaced piston slidable within said cylinder responsive to differences in fluid pressures on the opposed working faces thereof, at least one leading edge of at least one cylindrical side of said piston having portions disposed at different axial positions relative to the longitudinal axis of said piston and cylinder and being disposed to block one of said ports at a predetermined position of said piston along said axis which depends upon the angular orientation of said piston about said axis, first independently operative adjusting means for adjustably setting the angular position of said piston about said axis, adjustable connecting means responsive to pressure-induced axial movements of said piston relative to said cylinder for moving said steady rest means, and second independently operative adjusting means selectively operative for adjustably setting the relative positions of said piston and said steady rest means maintained by said connecting means, said first adjusting means and said second adjusting means being mutually independently operative, whereby successive different rates of movement of said steady rest means are determined by the angular setting of said piston about said axis independent of settings of said second independently operative adjusting means.

3. Machine tool apparatus as set forth in claim 2 wherein said leading edge of said piston has two substantially identical helical distributions over different but substantially equiangular distances about said axis, said helical distributions being disposed symmetrically opposite one another to develop substantially balanced forces on the adjacent working face of said piston responsive to fluid pressures experienced on said working face of said piston.

4. Machine tool apparatus as set forth in claim 2 wherein the spaces in said cylinder are filled with hydraulic fluid, wherein said one of said ports is a fluid-exhaust port, and further including a central piston shaft fixed with said piston and extending outside said cylinder in fluid-sealed relationship therewith, said first independently operative adjusting means for setting said piston comprising manually-actuated means outside of said cylinder for angularly adjusting and locking said piston shaft while permitting axial sliding movements thereof relative to said cylinder and base.

5. Machine tool apparatus as set forth in claim 4 wherein said piston shaft has a longitudinal slot in the exterior thereof, wherein said manually-actuated means comprises an annular knob in coaxial surrounding relationship to said shaft and angularly keyed therewith in the slot and longitudinally slidable in relation thereto, and means for locking said knob angularly and axially in relation to said axis and outside of said cylinder.

6. Grinding machine apparatus including means for supporting a workpiece in position to be operated upon by a grinding wheel, at least a pair of articulated steady rests mounted on a base for independent movements into supporting engagements with a workpiece at different positions, a pair of piston-cylinder units mounted on said base, each of said units comprising a cylinder mounted on said base and having axially-spaced fluid ports in the side wall thereof, a substantially cylindrically-surfaced piston slidable within said cylinder in fluid-tight relationship therewith responsive to differences in fluid pressures on the opposite working faces thereof, at least one leading edge of at least one cylindrical side of said piston having portions disposed at different axial positions relative to the longitudinal axis of said piston and cylinder and being disposed to block one of said ports at a predetermined position along said axis which depends upon the angular orientations of said piston about said axis, a first independently operative adjusting means for adjustably setting the angular position of said piston about said axis, an adjustable connecting means operatively connecting each of the pistons of said units to move a different one of said steady rests independently toward the workpiece, and a second independently operative adjusting means arranged to produce the desired adjustment of said adjustable connecting means, whereby movements of said steady rests are independently related to angular settings of different ones of said pistons about the longitudinal axes thereof, and also independent of the desired adjustment of said adjustable connecting means.

7. Grinding machine apparatus as set forth in claim 6 wherein the spaces in each said cylinder are filled with hydraulic fluid, wherein said one of said ports is a fluid-exhaust port, and wherein each of said units further includes a piston shaft fixed with said piston and extending outside of said cylinder in fluid-sealed relationship therewith, said means for setting said piston comprising manually-actuated means outside of said cylinder for independently angularly adjusting and locking each said piston shaft while permitting axial sliding movements thereof relative to said cylinder and base.

8. Grinding machine apparatus as set forth in claim 7 wherein said piston shafts are hollow, and wherein each of said second adjusting means comprises an adjusting rod disposed coaxially within said hollow piston shaft and rotatable in relation thereto in axially locked relationship therewith, said adjusting rod extending outwardly beyond at least one end of said piston shaft and having threaded means at an end thereof for coupling with a different one of said connecting means, and manually-actuated means for independently adjusting and setting each of said rods about the longitudinal axis thereof while permitting longitudinal movements thereof with the surrounding coaxial piston shaft.

9. Grinding apparatus as set forth in claim 8 wherein said connecting means between each of said rods and steady rests includes first camming means mounted for sliding movements on said base and having a camming surface thereon, a second member mounted for sliding movements on said base in position to engage and move one of said steady rests and to ride on said camming surface of said first camming means, and means theadedly connecting said first camming means with the threaded means at the end of one of said adjusting rods.

10. Grinding apparatus as set forth in claim 9 wherein at least one of said connecting means includes first camming means having a camming member with said camming surface thereon which is slidable along an axis inclined in relation to the intersecting longitudinal axis of one of said adjusting rods, said one of said rods having a substantially circular disk threadedly engaged therewith substantially along a diameter of said disk, said camming member having a transverse slot therein substantially normal to the sliding axis thereof, and said disk being closely mated with said camming member by way of said slot and prevented thereby from turning about said axis of said one of said rods, whereby axial movements of said rod causes concomitant movements of said disk relative to said camming member and of said caming member relative to one of said second members and of one of said steady rests.

11. A steady rest assembly for use on a machine tool and provided with at least one steady rest means movable into and out of operative engagement with a workpiece, a relatively fixed base portion arranged to be fixedly secured to a machine tool, an actuating means movably mounted upon said base portion for movement along a first predetermined axis, a supporting means movably mounted upon said base portion and arranged to support a steady rest means for movement into and out of engagement with a workpiece, and a cam assembly movably mounted upon said base portion and arranged to operatively interconnect said actuating means and said supporting means, said cam assembly including a camming member with a camming surface thereon slidable along a second predetermined axis inclined in relation to the first predetermined axis, a substantially circular disc threadedly engaged with said actuating means substantially along a diameter of said disc, said camming member having a transverse slot therein substantially normal to the second predetermined axis, and said disc being closely mated with said camming member by way of said slot and prevented thereby from turning about said actuating means, whereby movement of said actuating means along said first predetermined axis causes concomitant movement of said disc relative to said camming member and of said camming member relative to said supporting means.

References Cited
UNITED STATES PATENTS

| | | | |
|---|---|---|---|
| 2,141,596 | 12/1938 | Crompton | 51—238 |
| 2,655,828 | 10/1953 | Hazen | 51—238 |
| 2,986,124 | 5/1961 | Allemann | 91—394 |
| 2,898,890 | 8/1959 | Lynott | 91—357 |
| 3,076,296 | 2/1963 | Joyce | 51—238 |
| 3,120,157 | 2/1964 | Mello | 91—408 |
| 3,233,368 | 2/1966 | Price | 51—238 |

HAROLD D. WHITEHEAD, *Primary Examiner.*